US010748121B2

(12) United States Patent
Dotan-Cohen et al.

(10) Patent No.: US 10,748,121 B2
(45) Date of Patent: Aug. 18, 2020

(54) ENRICHING CALENDAR EVENTS WITH ADDITIONAL RELEVANT INFORMATION

(71) Applicant: Microsoft Technology Licensing, LLC, Redmond, WA (US)

(72) Inventors: Dikla Dotan-Cohen, Herzliya (IL); Ido Priness, Herzliya (IL); Ran Bernstein, Tel Aviv (IL); Inbal Budowski Tal, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 706 days.

(21) Appl. No.: 15/199,063

(22) Filed: Jun. 30, 2016

(65) Prior Publication Data

US 2018/0005194 A1    Jan. 4, 2018

(51) Int. Cl.
*G06Q 10/10* (2012.01)
*G06F 16/29* (2019.01)
*G06F 16/9032* (2019.01)

(52) U.S. Cl.
CPC ......... *G06Q 10/1095* (2013.01); *G06F 16/29* (2019.01); *G06F 16/90324* (2019.01); *G06Q 10/109* (2013.01)

(58) Field of Classification Search
CPC .............. G06Q 10/1095; G06Q 10/109; G06F 17/30241; G06F 17/3097
USPC ........................................................ 707/758
See application file for complete search history.

(56) References Cited

U.S. PATENT DOCUMENTS

| 8,457,888 | B2 | 6/2013 | Ranford |
| 9,008,688 | B2 | 4/2015 | Ding et al. |
| 9,195,972 | B2 | 11/2015 | Gopinath et al. |
| 9,235,830 | B1 * | 1/2016 | VanBlon .............. G06Q 10/109 |
| 2006/0200374 | A1 | 9/2006 | Nelken |

(Continued)

OTHER PUBLICATIONS

Xiaomei Zhang, Jing Zhao and Guohong Cao, "Who Will Attend?—Predicting Event Attendance in Event-Based Social Network", Department of Computer Science and Engineering, The Pennsylvania State University, 2015 16th IEEE International Conference on Mobile Data Management, pp. 74-83 (Year: 2015).*

(Continued)

*Primary Examiner* — Pierre M Vital
*Assistant Examiner* — Alicia M Antoine
(74) *Attorney, Agent, or Firm* — Shook, Hardy and Bacon, L.L.P.

(57) ABSTRACT

Computerized systems for providing a personalized computing experience are provided through enriched calendar event data. The enriched calendar event data provides an event type, additional location data for the calendar event, and the likely user attendance. To determine the enriched calendar event data, a user location pattern, and a calendar event pattern are determined. As future calendar events are detected, a set of features for the future calendar events is determined. Past calendar events having features similar to the detected future calendar event can then be determined. A user location for the similar past calendar events can be determined to form a user behavior pattern model indicating a user location for the similar past calendar events. A predicted user location for the future calendar event can be determined based upon the similar past calendar events and the user behavior pattern model.

20 Claims, 6 Drawing Sheets

(56) References Cited

U.S. PATENT DOCUMENTS

| | | | |
|---|---|---|---|
| 2008/0097815 A1* | 4/2008 | Koretz | G06Q 10/109 |
| | | | 705/7.19 |
| 2008/0167938 A1 | 7/2008 | Meisels et al. | |
| 2009/0036148 A1* | 2/2009 | Yach | G06Q 10/109 |
| | | | 455/457 |
| 2010/0114942 A1 | 5/2010 | Nelken | |
| 2010/0174998 A1 | 7/2010 | Lazarus et al. | |
| 2011/0184768 A1* | 7/2011 | Norton | G06Q 10/02 |
| | | | 705/5 |
| 2013/0218888 A1 | 8/2013 | Seligmann | |
| 2013/0238540 A1 | 9/2013 | O'Donoghue et al. | |
| 2014/0278086 A1* | 9/2014 | San Filippo | G01C 21/3423 |
| | | | 701/527 |
| 2015/0170045 A1* | 6/2015 | Kirkham | G06Q 10/06 |
| | | | 706/11 |
| 2015/0193819 A1 | 7/2015 | Chang | |
| 2016/0350721 A1* | 12/2016 | Comerford | G06Q 10/1095 |

OTHER PUBLICATIONS

"Boomerang Calendar", Retrieved on: Jun. 2, 2016 Available at: http://boomerangcalendar.com/.

\* cited by examiner

ENRICHING CALENDAR EVENTS WITH ADDITIONAL RELEVANT INFORMATION

BACKGROUND

A variety of computer implemented meeting and calendaring solutions are available to assist users in planning and organizing their schedules. In some cases, calendar items may be placed on a calendar by the user, or by some other application. These calendar items may be meetings the user typically attends in person, or via telephone or some on-line meeting application, or may be a calendar item that is merely optional or informational only. The calendar items may also be work related, or could be private (more from the user's life outside of work). However, the information made available by existing meeting and calendaring solutions is limited. Generally, such solutions have not offered enriched calendar event data allowing downstream consumers (possibly including the solution itself) to know of the user's likely physical location for any particular calendar event, the location of the event itself, as well as information regarding the type of calendar event. Advances in computing technology and the increased prevalence of modern computing devices has resulted in a dramatic increase in data available regarding these calendar items. The conventional solutions have not kept pace with these advances and have failed to capitalize on the available data, or gather it and make it available, in order to address these new challenges.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of this disclosure relate to computerized systems for providing a personalized computing experience for a user of the technologies described herein by providing enriched calendar event data that can be used by any number of consumers of the event data. The enriched calendar event data provides, in some embodiments, an event type for the calendar event (such as a work event, or a private, non-work event). Additionally the enriched calendar event data provides, in some embodiments, additional location data for the calendar event, and the likely user attendance (such as in-person, telephonic, or not at all). To determine the enriched calendar event data, a user location pattern is detected, such as by monitoring user activity and sensors associated with users and/or user devices. Additionally, a calendar event pattern may be determined from features of past calendar events. As future calendar events are detected, a set of features for the future calendar events can be determined. Past calendar events having features similar to the detected future calendar event can then be determined. A user location for the similar past calendar events can be determined to form a user behavior pattern model indicating a user location for the similar past calendar events. A predicted user location for the future calendar event can be determined based upon the similar past calendar events and the user behavior pattern model. This predicted user location can be provided to downstream users, such as a virtual assistant. Additionally, in some embodiments, based upon the features of the future calendar event and the similar past calendar events, a predicted location for the future calendar event is also determined and provided. Also, in some embodiments based upon the features of the future calendar event, and the similar past calendar events, as well as the user behavior pattern model, a predicted event type for the future calendar event is determined and provided. By providing this information, applications (such as virtual assistants) can inform users as to the type of calendar events (e.g. work events, private events), whether meetings are in-person, telephonic or merely on their calendars on an informational basis, whether commute time should be added to a calendar event, whether traffic information might be useful, or any of a number of other applications.

The enriched calendar event data may be provided to an application or service such as a personal assistant (sometimes referred to as a virtual assistant) service associated with the user, or may be provided as an application programming interface (API) to facilitate consumption of the enriched calendar event data by an application or service. In this way, embodiments of the disclosure are able to provide higher accuracy, more relevant and useful calendar event information, in a more-efficient way than conventional approaches.

BRIEF DESCRIPTION OF THE DRAWINGS

Aspects of the disclosure are described in detail below with reference to the attached drawing figures, wherein.

DETAILED DESCRIPTION

Figure 1:
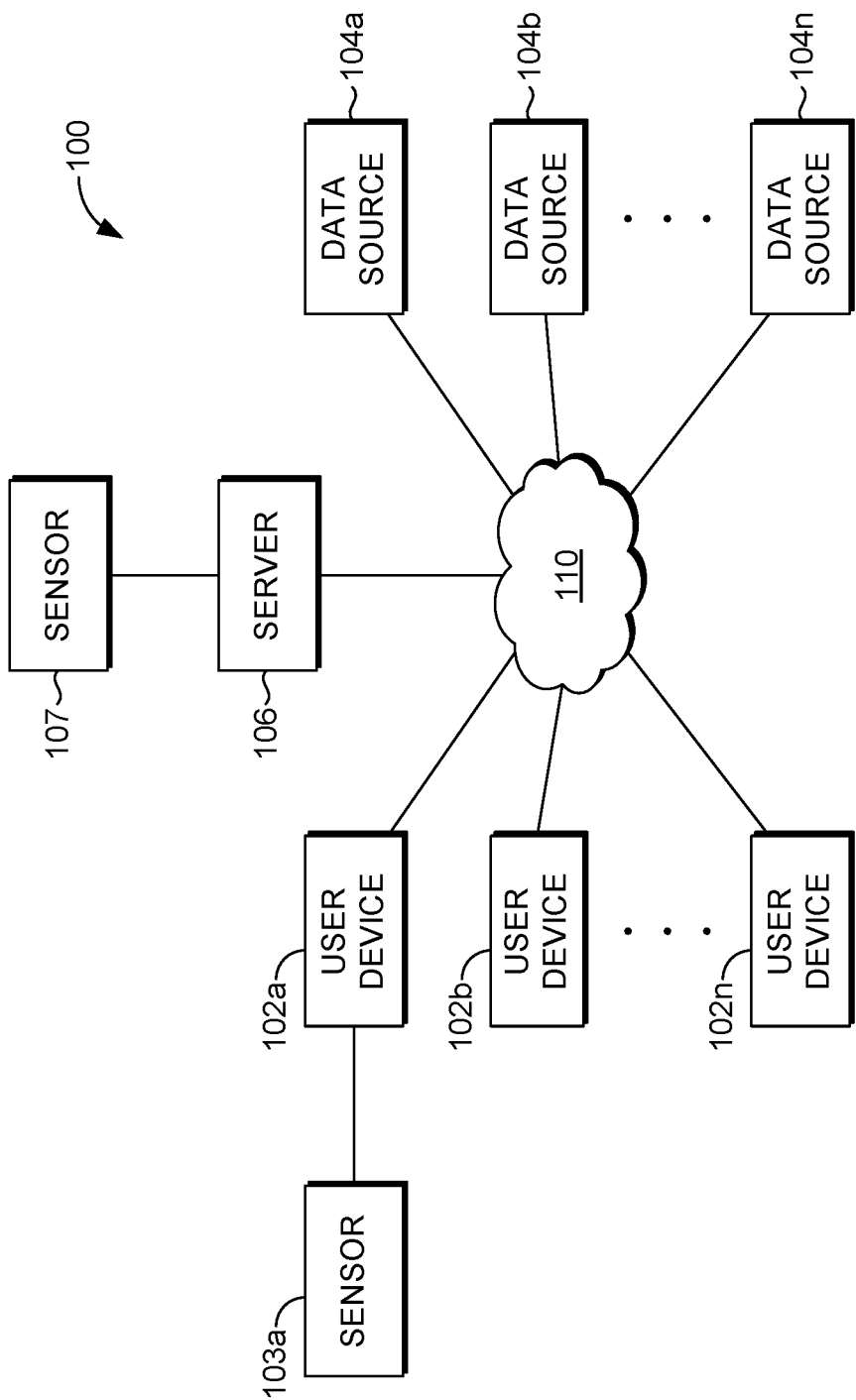
FIG. 1 is a block diagram of an exemplary computing environment suitable for use in implementing embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

The coalescence of telecommunications and computing technologies in the modern era has enabled, for the first time in human history, nearly constant communication and access to personal and job-related resources through a ubiquity of personal computing resources (including personal computing devices and cloud-computing coupled with communication networks). But at the same time, it is now commonplace for work to be done remotely and outside of traditional working hours. As a result, new computer technologies are emerging for tailoring computing services and information delivery to users, based on circumstances or other information that is specific to those users. Such personalization of computing services can provide information that is specifically relevant to a user, their individual schedule, and routines. One aspect of tailoring the personal computing experience to the user includes employing an analysis of calendar event data items, which may be sensed by the computer technology, to determine and provide enriched events.

Aspects of this disclosure provide a personalized computing experience for a user of the technologies described herein by providing enriched calendar event data that can be used by any number of consumers of the event data. The enriched calendar event data provides, in some embodiments, an event type for the calendar event (such as a work event, or a private, non-work event). Additionally the enriched calendar event data provides, in some embodiments, supplemental location data for the calendar event, as well as the likely user attendance (such as in-person, telephonic, or not at all). To determine the enriched calendar event data, a user location pattern is detected, such as by monitoring user activity and sensors associated with users and/or user devices. Additionally, a calendar event pattern may be determined from features of past calendar events. As future calendar events are detected, a set of features for the future calendar events can be determined. Past calendar events having features similar to the detected future calendar event can then be determined. A user location for the similar past calendar events can be determined to form a user behavior pattern model indicating a user location for the similar past calendar events. A predicted user location for the future calendar event can be determined based upon the similar past calendar events and the user behavior pattern model. This predicted user location can be provided to downstream users, such as a virtual assistant. This allows for efficiencies to be achieved in computing resources, and reduces overall processor load, by determining the enriched data and providing it to any number of downstream consumers (which do not have to be individually determined the enriched calendar data). Additionally, in some embodiments, based upon the features of the future calendar event and the similar past calendar events, a predicted location for the future calendar event is also determined and provided. Also, in some embodiments based upon the features of the future calendar event, and the similar past calendar events, as well as the user behavior pattern model, a predicted event type for the future calendar event is determined and provided. By providing this information, applications (such as virtual assistants) can inform users as to the type of calendar events (e.g. work events, private events), whether meetings are in-person, telephonic or merely on their calendars on an informational basis, whether commute time should be added to a calendar event, whether traffic information might be useful, or any of a number of other applications.

The enriched calendar event data may be provided to an application or service such as a personal assistant (sometimes referred to as a virtual assistant) service associated with the user, or may be provided as an application programming interface (API) to facilitate consumption of the enriched calendar event data by an application or service. In this way, embodiments of the disclosure are able to provide higher accuracy, more relevant and useful calendar event information, in a more-efficient way than conventional approaches.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors 103a, 107, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
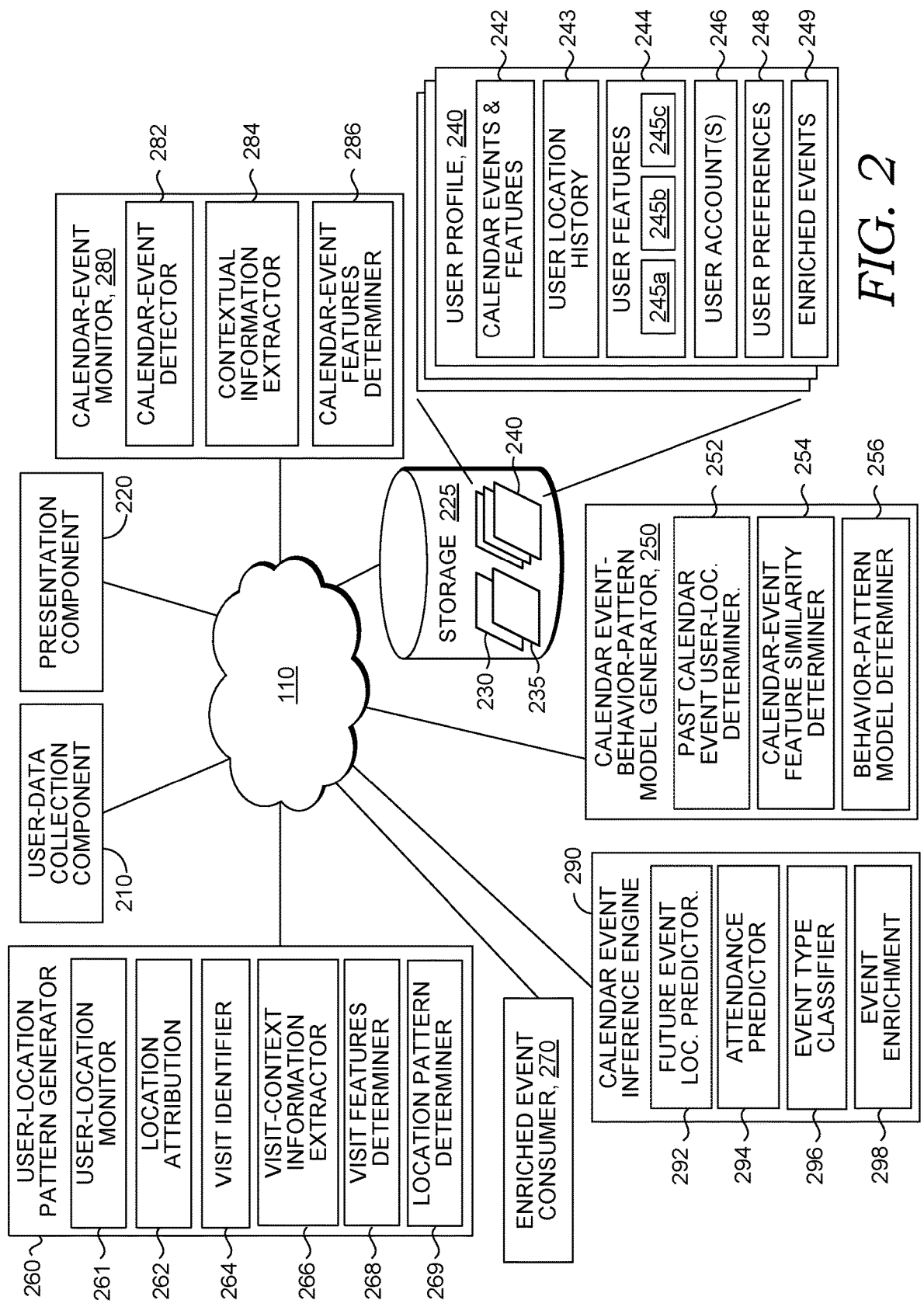
FIG. 2 is a block diagram is provided illustrating an exemplary calendar item enrichment system in which some embodiments of the present disclosure may be employed.

Operating environment 100 can be utilized to implement one or more of the components of calendar item enrichment system 200, described in FIG. 2, including components for collecting calendar event data, generating calendar event behavior pattern models, generating user location patterns, generating user profile details, and/or generating and/or presenting enriched calendar event information to consumers or users. Operating environment 100 also can be utilized for implementing aspects of process flow 300, described in FIG. 3. Referring now to FIG. 2, with FIG. 1, a block diagram is provided showing aspects of an example computing system architecture suitable for implementing an embodiment of the disclosure and designated generally as calendar item enrichment system 200. The calendar item enrichment system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

The calendar item enrichment system 200 includes network 110, which is described in connection to FIG. 1, and which communicatively couples components of calendar item enrichment system 200, including user-data collection component 210, presentation component 220, user profile 240 (through storage 225), calendar event behavior pattern generator 250, user location pattern generator 260, calendar event monitor 280 and calendar event inference engine 290. As described herein, user features in user profile 240 are generated based on different user signals, such as location history, user accounts, etc. Additionally, signals from calendar event behavior pattern generator 250, user location pattern generator 260 and additional user signals may be combined together to generate combined insights or features. As an example, user historical location patterns may be considered in combination with meetings having a specific attendee. The components of calendar item enrichment system 200 may be embodied as a set of compiled computer instructions or functions, program modules, computer software services, or an arrangement of processes carried out on one or more computer systems.

It should be understood that the calendar item enrichment system 200 shown in FIG. 2 is an example of one system in which embodiments of the present disclosure may be employed. Each component shown may include one or more computing devices similar to the computing device 100 described with reference to FIG. 1. The calendar item enrichment system 200 should not be interpreted as having any dependency or requirement related to any single module/component or combination of modules/components illustrated therein. Each may comprise a single device or multiple devices cooperating in a distributed environment. For instance, the calendar item enrichment system 200 may comprise multiple devices arranged in a distributed environment that collectively provide the functionality described herein. Additionally, other components not shown may also be included within the network environment. It should be understood that the calendar item enrichment system 200 and/or its various components may be located anywhere in accordance with various embodiments.

The calendar item enrichment system 200 generally operates to supply to an enriched event consumer 270 (such as a personal digital assistant, for example) enriched calendar event data including the event location, the inferred attendance and location of the user for the event, and the event type. The system 200 gathers, organizes and analyzes data including calendar event features, user location patterns, calendar event patterns and other user features to provide the enriched calendar event data. The system 200 thus is able to: determine calendar event items and features, and calendar event patterns for user profiles; generate meeting location, attendance and type models; and provide enriched calendar event data to consumers, allowing for a variety of downstream uses.

User-data collection component 210 is generally responsible for accessing or receiving (and in some cases also identifying) calendar event and user data from one or more data sources, such as data sources 104a and 104b through 104n of FIG. 1. In some embodiments, user-data collection component 210 may be employed to facilitate the accumulation of calendar item/meeting data of all users of the calendar item enrichment system 200 (including crowd-sourced data). The data may be received (or accessed), and optionally accumulated, reformatted and/or combined, by user-data collection component 210 and stored in one or more data stores such as storage 225, where it may be available to other components of the calendar item enrichment system 200. Further, the user-data collection component 210 may be configured to associate each of the calendar event data elements with one or more user profiles and to store the associated calendar event data elements in a corresponding user profile 240.

Example system 200 also includes storage 225. Storage 225 generally stores information including data, computer instructions (e.g., software program instructions, routines, or services), and/or models used in embodiments of the technologies described herein. In an embodiment, storage 225 comprises a data store (or computer data memory). Further, although depicted as a single data store component, storage 225 may be embodied as one or more data stores or may be in the cloud.

Calendar event and user data may be received from a variety of sources where the data may be available in a variety of formats. For example, in some embodiments, calendar event and user data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as calendar event and user data from a data source 104a, and may be embodied as hardware, software, or both. By way of example and not limitation, calendar event and user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user-data associated with events; etc.) including user activity that occurs over more than one user device, user history, session logs, application data, contacts data, calendar and schedule data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein. In some respects, calendar event data may be provided in user signals. A user signal can be a feed of calendar event data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, or as needed.

Calendar event monitor 280 is generally responsible for extracting calendar event data from the data gathered by user data collection component 210. Calendar event monitor 280 receives the calendar event data, including both historic and future calendar data for calendar events. The received calendar event data may be used to determine calendar event information, which may include a variety of features associated with the meeting or calendar event (sometimes referred to herein as "variables") or other information regarding specific calendar event items and related contextual information. Embodiments of calendar event monitor 280 may determine, from the monitored calendar data, calendar event items associated with a particular user. As described herein, the calendar event information determined by calendar event monitor 280 may include calendar events information from multiple user devices associated with the user and/or from cloud-based services associated with the user (such as email, calendars, social-media, or similar information sources), and which may include contextual information associated with the identified calendar event. Calendar event monitor 280 may determine current or future calendar event information and may also determine historical calendar event information, in some embodiments, which may be determined based on gathering observations of calendar events over time, and accessing calendar logs of past activity. Further, in some embodiments, calendar event monitor 280 may determine calendar events (which may include historical activity) from other similar users' calendars (i.e. crowdsourcing), as described herein. This information may include features associated with an organization or group to which the user belongs, or may include features which are global in nature.

In some embodiments, information determined by calendar event monitor 280 may be provided to storage 225 and stored in a user profile 240 as calendar events and features 242 as further-described below. As described previously, calendar event features may be determined by monitoring user data received from user-data collection component 210. In an embodiment, calendar event monitor 280 comprises one or more applications or services that analyze information detected via one or more user devices used by the user and/or cloud-based services associated with the user, to determine calendar event information and related contextual information. Information about calendar event items associated with a user may be determined from the user data made available via user-data collection component 210, and maybe provided to calendar event monitor 280, or other components of system 200.

More specifically, in some implementations of calendar event monitor 280, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

Some embodiments of calendar event monitor 280, or its subcomponents, may determine a device name or identification (device ID) for each device associated with a user. This information about the identified user devices associated with a user may be stored in a user profile associated with the user, such as user profile 240. In an embodiment, the user devices may be polled, interrogated, or otherwise analyzed to determine information about the devices. This information may be used for determining a label or identification of the device (e.g. a device id) so that the user interaction with device may be recognized from user data by calendar event monitor 280. In some embodiments, users may declare or register a device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

As shown in example system 200, calendar event monitor 280 includes a calendar event detector 282, contextual information extractor 284, and a calendar event features determiner 286. In some embodiments, calendar event monitor 280, one or more of its subcomponents, or other components of system 200, such as user-location pattern generator 260, calendar event behavior pattern model generator 250, or calendar event inference generator 290 may determine interpretive data from received user data. Interpretive data corresponds to data utilized by these components of system 200 or subcomponents of calendar event monitor 280 to interpret user data. For example, interpretive data can be used to provide other context to user data, which can support determinations or inferences made by the components or subcomponents. Moreover, it is contemplated that embodiments of calendar event monitor 280, its subcomponents, and other components of system 200 may use user data and/or user data in combination with interpretive data for carrying out the objectives of the subcomponents described herein. Additionally, although several examples of how calendar event monitor 280 and its subcomponents may identify calendar event information are described herein, many variations are possible in various embodiments of the disclosure.

Calendar event detector 282, in general, is responsible for detecting (or identifying) calendar event items. Embodiments of calendar event detector 282 may be used for determining current or future calendar events or one or more historical calendar events. Some embodiments of calendar event detector 282 may monitor user data for calendar event related features or variables corresponding to the events, such as duration, time, title, location information, recurring event (or not), attendee list, the email domain of attendees, or similar information.

Contextual information extractor 284 determines and extracts information about calendar events, such as contextual information. Examples of extracted calendar event information may include keywords, invitees, emails or social media posts related to the event, user browsing activity or online activity associated with the event, or nearly any other data related to calendar events associated directly or indirectly with the user. The contextual information extractor also associates the determined contextual information with the detected calendar event. For example, some embodiments of contextual information extractor 284 provide the determined contextual information to calendar event features determiner 286, which determines features of the calendar event and/or related contextual information. Contextual information may also be used for pattern identification, with or without additional signals. Additionally, context may extend beyond any specific meeting. For example, the meeting before or after a particular meeting may provide context. Continuing with the example, the before meeting may have a title (such as "important review), and it may be known that the user tends to be at work at least two hours prior to past meeting with this title. This context can affect the location prediction of the user for other meeting scheduled before "important review" meetings. The context may also include other overlapping meetings.

Some embodiments of contextual information extractor 284 determine contextual information related to a group or organization of which the user is a part, such as entities identified in a calendar event or related to the calendar event (e.g., keywords common to an organization, group characteristics, recipients of a group email sent by the user having a common domain name, attachments, links or other content that is known to be associated with an organization, and/or specific conference room names). Additionally, contextual information extractor may also identify contextual features that are more global in nature (e.g. terms like OOO or OOF to indicate out of office). Other contextual information, by way of example and not limitation, may include context features such as location data; which may be represented as a location stamp associated with the activity; contextual information about the location, such as venue information (e.g. this is the user's office location, home location, school, restaurant, movie theater, etc.).

In embodiments using contextual information related to user devices, a user device may be identified by detecting and analyzing characteristics of the user device, such as device hardware, software such as operating system (OS), network-related characteristics, user accounts accessed via the device, and similar characteristics. For example, as described herein, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user profile 240. In an embodiment, the user devices may be polled, interrogated, or otherwise analyzed to determine contextual information about the devices. This information may be used for determining a label or identification of the device (e.g. a device id) so that user activity on one user device may be recognized and distinguished from user activity on another user device. Further, as described herein, in some embodiments, users may declare or register a user device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

In some implementations, contextual information extractor 284 may receive user data from user-data collection component 210, parse the data, in some instances, and identify and extract context features or variables (which may also be carried out by calendar event features determiner 286). Context variables may be stored as a related set of contextual information associated with the calendar event, and may be stored in a user profile such as in calendar events and features information component 242. In some cases, contextual information may be used by one or more calendar event pattern consumers, such as for providing additional details to a user to enhance a user experience, such as when to leave for a meeting.

Calendar event features determiner 286 is generally responsible for determining calendar event-related features (or variables) from information about a calendar event (from calendar event detector 282) and/or from related contextual information (from contextual information extractor 284). Calendar event features determiner outputs and stores the determined set of calendar event features, any organization or group features, as well as any global features. These features are stored in user profile 240 as calendar events and features 242.

User location pattern generator 260 is generally responsible for monitoring user data for information that may be used for determining current user visits to a semantic location, context of the visits (current context) and determining location patterns for the user. User location pattern generator 260 also may determine historic user visits and, in some instances, features associated with those historic visits, which may be used for determining context associated with the historic visits. In some embodiments, information determined by user location pattern generator may be stored to user profile 240 in the user location history 243 and user routines 245a of user features 244.

At a high level, embodiments of user location pattern generator 260 may use current user data including location information to determine the user's current location (location attribution, which may be carried out by location attribution component 262 described below), and from the current location attribution, determine a current visit for the user. In some embodiments, a current visit may be determined (e.g. by visit identifier 264, described below) using features identified (e.g. by visit features determiner 268, described below) from the user data (including current or historical user data) such as how long the user is at a particular location. For example, user data indicating that a user was in the same approximate geographical location for a period of time is more likely to imply a visit occurred than user data indicating the user was only at a particular location briefly (such as in the case where a user is driving by a location, but not visiting it.)

User location history information associated with previous visits to the current location may also be used for determining a current visit. In one embodiment, location history information about where a user just came from (the user's previous location) is used for facilitating visit identification, such as where disambiguation is used to identify semantic information about the current visit. For example, where user location history information indicates that the user was previously at a restaurant, and current location information indicates the user is at a location that has a coffee shop and a restaurant, it may be determined, using disambiguation, that the user is more likely at the coffee shop.

As shown in example system 200, user location pattern generator 260 comprises a user location monitor 261, a location attribution component 262, visit identifier 264, visit context information extractor 266, a visit features determiner 268, and a location pattern determiner 269. In some embodiments, user location pattern generator 260 and/or one or more of its subcomponents may determine interpretive data from received user data. Interpretive data corresponds to data utilized by the subcomponents of user location pattern generator 260 to interpret user data. For example, interpretive data can be used to provide context to user data, which can support determinations or inferences made by the subcomponents. Moreover, it is contemplated that embodiments of user location pattern generator 260 and its subcomponents may use user data and/or user data in combination with interpretive data for carrying out the objectives of the subcomponents described herein.

User location monitor 261 receives user location information from received user data (such as the data collected by user data collection component 210). Location attribution 262, in general, is responsible for determining location attribution using current user location data. Examples of user location data may include any user data (including sensor data) indicating location information, such as GPS, wireless communications (e.g. cellular or WiFi Access Point), IP addresses associated with current user activity, user check-in-social-networking information, or other user data from which location information may be determined. In some embodiments, location attribution 262 attributes location to a location of interest to the user, such as locations frequented by the user (sometimes called "hubs"). For example, in some embodiments, locations indicated by the location data may be clustered and the dense clusters used for determining those locations wherein a user spends time (e.g. hubs). Further, in some embodiments, location attribution 262 performs filtering, such as to remove outliers (e.g. a WI-Fi data point from 300 yards away suggesting that the user is at that location), clustering, or other means to determine location data for attribution. In addition to determining current location, some embodiments of location attribution 262 may also perform location attribution with historic location data associated with the user (such as logged location information, which may be stored in a user profile such as historic location data 243 in user profile 240). The current and historic location attributions may be used for determining visits, including current and historical visits.

Visit identifier 264, in general, is responsible for determining (or identifying) a visit has occurred. Embodiments of visit identifier 264 may be used for determining a current visit or one or more historical visits, such as historical visits to the same location as the current visit. Some embodiments of visit identifier 264 may use the location attributions determined by location attribution component 262 to identify a visit. For example, as described herein, user data indicating that a user was in the same approximate geographical location for a period of time may indicate a visit. In particular, in one embodiment, visits may be identified by concatenating consecutive (or substantially consecutive) user location data near the same location, and in some cases filtering out outliers. A current visit may be determined using current location attribution data, and historical visits determined using the historical location attribution data.

Visit context information extractor 266, in general, is responsible for determining contextual information related to the visits (detected by visit identifier 264), such as context features or variables associated with a particular visit or other information related to the visit. In some embodiments, contextual information extractor 266 may associate the determined contextual information with the related visit and may also log the contextual information with the visit. Alternatively, the association or logging may be carried out by another service. For example, some embodiments of contextual information extractor 266 provide the determined contextual information to visit features determiner 268, which determines features or variables associated with the visit (such as described below) and/or related contextual information.

Some embodiments of contextual information extractor 266 determine contextual information related to a visit such as entities related to the visit (e.g., other people present at the location), a venue or venue-related information about the visit, or detected activity performed by the user at the location. By way of example and not limitation, this may include context features such as information about the location, such as venue information, (e.g., this is the user's office location, home location, gym, etc.), time (including, for instance, arrival/departure times or duration of stay), day, and/or date, which may be represented as a time stamp associated with the visit, other user activity preceding and/or following the visit, other information about the visit such as entities associated with the visit (e.g., venues, people, objects, etc.), information detected by sensor(s) on user devices associated with the user that is concurrent or substantially concurrent to the visit (e.g., user activity detected via a computing device such as watching a streaming movie on an entertainment console, or motion information or physiological information detected on a fitness tracking user device, for example), user interaction on one or more user devices (such as browsing certain types of webpages, listening to music, taking pictures, composing email, or any other type of user device interaction), social media activity, or any other information related to the visit that is detectable that may be used for determining feature or patterns associated with user visits.

In some implementations, visit context information extractor 266 may receive user data from user-data collection component 210, parse the data, in some instances, and identify and extract context features or variables associated with the visit (similar to contextual information extractor 284 discussed above). Context variables may be stored as a related set of contextual information associated with a visit, and may be stored in a user profile such as in user historic location history component 243.

Visits features determiner 268, in general, is responsible for identifying features associated with visits. Features associated with a visit may be used, by user location pattern generator 260, to determine the location patterns associated with a user. Features may include contextual information and other details associated with a visit. By way of example and not limitation, features may include the location (such as the geographic and/or semantic location), time and date, arrival time, departure time, length of stay, previous location(s) visited, next locations visited, sequences or series of locations, day of the week, user activity during the visit, user activity prior to or subsequent to the visit, information about other users associated with the visit (for example, if the visit is a meeting, then the other invitees/attendees of the meeting, or nearly any measurable or otherwise determinable variable associated with a visit. The date-time and location associated with a user visit to a location are stored as part of the user location history 243, and may later be used by the calendar event behavior pattern model generator 250, as further described below. Further, in some embodiments, the context or venue association with the location is stored as well (e.g. not only geographical coordinates, but also "movie theater", or "school".) In one embodiment, features determined by component 266 may be stored as label(s), tags, or metadata associated with the visit information, and may be used for indexing visits determined by component 264. Information about visits determined by user location pattern generator 260, including in some embodiments the determined features associated with the visit(s), may be stored in a user profile 240 associated with a user.

Location pattern determiner 269 is generally responsible for determining a user location pattern based on similarities identified in user location information. In particular, location pattern determiner 269, as a part of user location pattern generator 260, may determine a user location pattern based on repetitions of similar location features associated with a plurality of observed location events. In some embodiments, location events or patterns may be determined using location inference logic 230, such as rules, associations, conditions, prediction models, or pattern inference algorithms. The location inference logic 230 can comprise the logic (rules, associations, statistical classifiers, etc.) used for identifying and classifying user locations or visits, and also for determining location patterns. In some embodiments, the user pattern(s) determined by location pattern determiner 269 may be stored as inferred user location patterns data 245a of user features 244. This data may be used, in some embodiments, to determine or infer whether the user will physically attend at meeting, and possibly to determine the type of meeting or calendar event.

In some embodiments, user location pattern determiner 269 provides a pattern of user location and an associated confidence score regarding the strength of the user location pattern, which may reflect the likelihood that a future user location will follow the pattern. More specifically, in some embodiments, a corresponding confidence weight or confidence score may be determined regarding a determined user location pattern. The confidence score may be based on the strength of the pattern, which may be determined by the number of observations (of a particular user location event or visit) used to determine a pattern, how frequently the user's locations are consistent with the location pattern, the age or freshness of the location observations, the number of features in common with the location observations that make up the pattern, or similar measurements.

In some instances, the confidence score may be considered when providing a determined user location pattern. For example, in some embodiments, a minimum confidence score may be needed before using the user location pattern by other components (such as the calendar event behavior pattern model generator 250 or the calendar event inference engine 290). In one embodiment, a threshold of 0.6 (or just over fifty percent) is utilized such that only user location patterns having a 0.6 (or greater) likelihood of predicting user location may be may be provided. Nevertheless, where confidence scores and thresholds are used, determined patterns of user location with confidence scores less than the threshold may still be monitored and updated based on additional location observations, since the additional observations may increase the confidence for a particular pattern.

Some embodiments of location pattern determiner 269 determine a pattern according to the example approaches described below, where each instance of a location event or visit, has corresponding historical values of tracked location features (variables) that form patterns, and location pattern determiner 269 may evaluate the distribution of the tracked variables for patterns. In the following example, a tracked variable for a user location event is a timestamp corresponding to an observed instance of the user location. However, it will be appreciated that, conceptually, the following can be applied to different types of historical values.

A bag of timestamps (i.e., values of a given tracked variable) can be denoted as $\{t_m\}_{m=1}^{M}$, and mapped to a two-dimensional histogram of hours and days of the week. The two-dimensional histogram can comprise a summation over the instances of the user location or visit, such as:

$$h_{ij} = \Sigma_{m=1}^{M} \mathbb{I}[\text{dayOfWeek}[t_m]=i] \cdot \mathbb{I}[\text{hourOfDay}[t_m]=j].$$

This histogram can be used to determine derivative histograms. For example, a day of the week histogram may correspond to: $h_j = \Sigma_i h_{ij}$. An hour of the day histogram may correspond to: $h_i = \Sigma_j h_{ij}$. As further examples, one or more histograms may be determined for particular semantic time resolutions in the form of: $h_{iC} = \Sigma_{j \in C} h_{ij}$. Any of various semantic time resolutions may be employed, such as weekdays and weekends, or morning, afternoon, and night. An example of the latter is where morning C∈(morning, afternoon, night), morning={9, 10, 11}, afternoon={12, 13, 14, 15, 16}, and night={21, 22, 23, 24}.

An additional data structure utilized in representing an event can comprise the number of distinct time stamps in every calendar week that has at least one timestamp therein, which may be represented as:

$$w_i^j = \|\{m | t_m \text{ is within the } i\text{-th } j \text{ week period}\}\|.$$

As an example, $w_2^3$ can denote the number of distinct timestamps during the $2^{nd}$ three-week period of available timestamps. $N^{(j)}$ may be utilized to denote the number of j-week time stamps available in the tracked data; for example, $N^{(3)}$ denotes the number of three-week periods available in the timestamps.

Location pattern determiner 269 (or user location pattern generator 260) may generate a confidence score that quantifies a level of certainty that a particular pattern is formed by the historical values in the tracked variable. In the following example, the above principles are applied utilizing Bayesian statistics. In some implementations, a confidence score can be generated for a corresponding tracked variable that is indexed by a temporal interval of varying resolution. For timestamps, examples include Tuesday at 9 am, a weekday morning, and a Wednesday afternoon. The confidence score may be computed by applying a Dirchlet-multinomial model and computing the posterior predictive distribution of each period histogram. In doing so, a prediction for each bin in a particular histogram may be given by:

$$x_i = \frac{\alpha_0 h_i}{\sum_i^K (\alpha_0 + h_i)};$$

where K denotes the number of bins, $\alpha_0$ is a parameter encoding the strength of prior knowledge, and $i^* = \arg\max_j x_i$. Then, the pattern prediction is the bin of the histogram corresponding to $i^*$ and its confidence is given by $x_{i^*}$. As an example, consider a histogram in which morning=3, afternoon=4, and evening=3. Using $\alpha_0===10$, the pattern prediction is afternoon, and the confidence score is $$\frac{10+4}{(10+3)+(10+4)+(10+3)} = \frac{14}{40} \approx 0.35.$$

In accordance with various implementations, more observations result in an increased confidence score, indicating an increased confidence in the prediction. As an example, consider a histogram in which morning=3000, afternoon=4000, and evening=3000. Using a similar calculation, the confidence score is $$\frac{4010}{10030} \approx 0.4.$$

Also, in some implementations, a confidence score can be generated for a corresponding tracked variable that is indexed by a period and a number of timestamps. Examples include 1 specific location event per week, and 3 of the specific location events every 2 weeks. Using a Gaussian posterior, a confidence score may be generated for a pattern for every period resolution, denoted as j. This may be accomplished by employing the formula:

$$\hat{\mu}^{(j)} = \lambda \left( \frac{1}{N^{(j)}} \sum_i^{N^{(j)}} w_i^{(j)} \right) + (1-\lambda)\mu_0, \text{ where } \lambda = \frac{\sigma_0^2}{\frac{\sigma^2}{N^{(j)}} + \sigma_0^2}.$$

In the foregoing, is the sample variance, and $\sigma_0^2$ and $\mu_0$ are parameters to the formula. A confidence score can be computed by taking a fixed interval around the number of time stamps prediction and computing the cumulative density as:

$$conf_j = P(|x - \hat{\mu}^{(j)}| < \alpha) = \int \mathcal{N}(x | \hat{\mu}^{(j)}, \hat{\sigma}^{(j)}),$$

$$\text{where } \hat{\sigma}^{(j)} = \frac{1}{\frac{N^{(j)}}{\sigma^2} + \frac{1}{\sigma_0^2}}.$$

As an example, consider the following observations: $w_1^{(1)}=10$, $w_2^{(1)}=1$, $w_3^{(1)}=10$, $w_4^{(1)}=0$, $w_1^{(2)}=11$, and $w_2^{(2)}=10$, $N^{(1)}=4$, and $N^{(2)}=2$, Using $\mu_0=1$ and $\sigma_0^2=10$, $\mu^{(1)}=4.075$, and $conf_1=0.25$. Furthermore, $\mu^{(2)}=10.31$ and $conf_2=0.99$. In the foregoing example, although fewer time stamps are available for two week periods, the reduced variance in the user signals results in an increased confidence that a pattern exists.

Having determined that a pattern exists, or that the confidence score for a pattern is sufficiently high (e.g., satisfies a threshold value), location pattern determiner 269 may identify that a plurality of user location events for the user corresponds to a user location pattern for the user.

In some embodiments, patterns of user location events or visits may be determined by monitoring one or more location features, as described herein. These monitored location features may be determined from the user data described herein as tracked variables or as described in connection to user-data collection component 210. In some cases, the variables can represent context and/or semantic similarities among multiple user actions (location events). In this way, patterns may be identified by detecting variables or features in common over multiple location events. More specifically, features associated with a first event may be correlated with features of a second event to determine a likely pattern. An identified feature pattern may become stronger (i.e., more likely or more predictable) the more often the user location event-related observations that make up the pattern are repeated. Similarly, specific features can become more strongly associated with a user location pattern as they are repeated.

Continuing with system 200 of FIG. 2, calendar event behavior pattern model generator 250 is generally responsible for determining user behavior or location patterns based on the user behavior associated with similar calendar events. Calendar event behavior pattern model generator 250 determines one or more models that can predict user location based on determined calendar event features. In some embodiments, calendar event behavior pattern model generator 250 may run on a server, as a distributed application across multiple devices, or in the cloud.

At a high level, calendar event behavior pattern model generator 250 may receive user-historic location information, which may be received from user location history 243 or user features 245a, and historic calendar events information from calendar events monitor 280 stored in calendar events and features 242. One or more inference algorithms may be applied to the user location-related information and calendar event information to determine a set of likely user and calendar event patterns. For example, patterns may be determined based on similar instances of observation of user location or associated contextual information, which may be referred to as "in-common features" of calendar event-related information. The inferred activity pattern information may be provided to an enriched event consumer 270 and/or used to generate a pattern based prediction regarding likely future user locations for calendar events. In some embodiments, a corresponding confidence is also determined for the patterns (or predictions based on the patterns), as described herein. Further, the calendar event behavior pattern (or prediction of future action based on a pattern) may comprise a single (future-occurring) user behavior for an event that is likely to occur, a sequence of future user actions, or probabilities for more than one future action; for example, and eighty percent likelihood that the user will be physically present at the office for a meeting, and a twenty percent likelihood that the user will attend the meeting via telephone.

Calendar event behavior pattern model generator 250 outputs a calendar event and a user location during that calendar event time, which is stored again in user profile 240 in the calendar events and features 242. If the user changed locations during the event, that data is also associated with the calendar event and stored in calendar events and features 242. Calendar event behavior pattern model generator 250 also outputs user behavior patterns for similar meetings (meetings having similar features) and stores those patterns in meeting pattern features 245b in user profile 240.

As shown in example system 200, calendar event behavior pattern model generator 250 comprises past calendar event user location determiner 252, calendar event features similarity identifier 254, and behavior pattern model determiner 256. Past calendar event user location determiner 252 determines the location of a user during the time of the calendar event item. The past calendar event user location determiner uses the historic calendar event items stored in calendar events and features 242 by calendar event monitor. Additionally, past calendar event user location determiner 252 uses the user's location history 243. Using these two pieces of data, the past calendar event user location history determines the location of the user during the calendar event and associates that calendar event with the user location. This user-location data during the calendar event is stored in the calendar events and features 242. In one embodiment, the user may change location during the event, such as starting a meeting or call in one location, and finishing the meeting or call in another location. In these instances, a location change feature may be added to indicate the changed location during the meeting.

Calendar event features similarity identifier 254 is generally responsible for determining similarity of calendar events having similar features (put another way, calendar event features characterizing a first calendar event that are similar to calendar event features characterizing a second user calendar event). Calendar events having in-common features may be used to identify a behavior pattern, which may be determined using behavior pattern model determiner 256.

For example, in some embodiments, features similarity identifier 254 may be used in conjunction with one or more pattern based predictors (a subcomponent of behavior pattern model determiner 256) to determine a set of calendar events that have in-common features. In some embodiments, this set of calendar events may be used as inputs to a pattern based predictor, as described below. The calendar event features similarity determiner also is generally responsible for categorizing prior calendar item events based on the similar features identified by features similarity identifier 254.

The behavior pattern model determiner 256 may be configured to perform a deep analysis of the prior calendar item events, for example, the contextual information related to the prior calendar item events, the prior calendar event features (such as user location, changed location, group features and global features). The deep analysis may be implemented, for instance, using computer learning algorithms. The behavior pattern model determiner 256 may operate to detect patterns or trends in across multiple variables for the prior calendar item events. The behavior pattern model determiner 256 determines user-location behavior patterns for similar meetings (the sets of meetings having similar features determined by calendar event feature similarity determiner 254). In some embodiments, the behavior pattern model determiner 256 determines a user location behavior model for calendar event items. Further, in some embodiments, information determined by calendar event behavior pattern model generator 250 (or one or more subcomponents), user location information determined from user-location pattern generator 260 (or one or more subcomponents), other information from user profile 240, and/or other user data may be combined together to generate combined insights or features. For instance, as described previously, user historical location patterns may be considered in combination with meetings having a specific attendee to determine that a user usually attends (or rarely attends) where that specific attendee (or group of attendees) are invited to the meeting.

Behavior pattern model determiner 256 is generally responsible for determining a user behavior pattern model based on similarities identified in user information and calendar item event information. In particular, behavior pattern model determiner 256 may determine that certain features are predictive of user behavior in the user model, while other features are less predictive. The predictive features are weighted higher in the resultant model.

In some embodiments, the predictive features and resultant patterns and models may be determined using pattern inferences logic 235. Pattern inferences logic may include rules, associations, conditions, prediction and/or classification models, or pattern inference algorithms. The pattern inferences logic 235 can take many different forms depending on the particular activity pattern or the mechanism used to identify a behavior pattern, or identify feature similarity among observed calendar item events to determine the pattern. For example, some embodiments of pattern inferences logic 235 may employ machine learning mechanisms to determine feature similarity, or other statistical measures to determine the calendar item events belonging to a set of "example user locations" that support the determined pattern, as further described below. In some embodiments, the behavior pattern(s) determined by behavior pattern model determiner 256 may be stored as inferred meeting pattern features 245b in user features 244.

In some embodiments, behavior pattern model determiner 256 provides a pattern of user location associated with the calendar item event and an associated confidence score regarding the strength of the user pattern, which may reflect the likelihood that a future user location will follow the pattern. More specifically, in some embodiments, a corresponding confidence weight or confidence score may be determined regarding a determined user location pattern for the calendar event. The confidence score may be based on the strength of the pattern, which may be determined based on the number of observations (of a particular calendar item event) used to determine a pattern, how frequently the user's location is consistent with the pattern, the age or freshness of the location observations, the number of similar features, types of features, and/or degree of similarity of the features in common with the calendar item event that make up the pattern, or similar measurements. In some embodiments, the features are weighted or conflated by behavior pattern model determiner 256. For example, calendar event feature similarity obtained by calendar event feature similarity determiner 254 may be weighted more heavily than a user location pattern from location pattern determiner 269. Additionally, user-related features are generally given more weight than group or global features. Again, in some embodiments, the behavior pattern(s) determined by behavior pattern model determiner 256 may be stored as inferred or interpretted meeting pattern features 245b in user features 244.

Prior to discussing calendar event inference engine 290, the data stored in user profile 240 (to this point) will be discussed and summarized. As discussed above, calendar events and features 242 includes calendar events and features of those events, mostly determined from calendar event monitory 280. User location history 243 contains data from user data collection component 210, as well as from user location pattern generator 260. User features 244 generally includes those features related to the user (as opposed to calendar event features stored in component 242). The baseline user location routines are obtained from user location pattern generator 260, and stored in 245a. This information includes the location patterns determined by location pattern determiner 269, and may include information about likely user hubs (such as home, work, gym, school, etc.). The calendar event behavior pattern model generator 250 stores patterns regarding past calendar events in 245b, as discussed above. Other user information and features known about the user are stored in 245c. This information includes, for example, information from contextual extractor 284 which may include, for example, a user's family members, and the output of the contextual content analysis of event information. User account(s) data 246 generally includes user data collected from user-data collection component 210 (which in some cases may include crowd-sourced data that is relevant to the particular user) or other semantic knowledge about the user. In particular, user account(s) data 246 can include data regarding user emails, texts, instant messages, calls, and other communications; social network accounts and data, such as news feeds; online activity; calendars, appointments, or other user data that may have relevance for determining unaddressed events; user availability; and importance, urgency, or notification logic. Embodiments of user account(s) data 246 may store information across one or more databases, knowledge graphs, or data structures. User preferences 248 generally include user settings or preferences associated with the user or user calendar events. By way of example and not limitation, such settings may include user preferences about specific meetings (and related information) that the user desires be explicitly monitored or not monitored or categories of activities to be monitored or not monitored, crowdsourcing preferences, such as whether to use crowd sourced information, or whether the user's location pattern information may be shared as crowdsourcing data; and preferences about which enriched event consumers 270 may consume the user's enriched event information. The enriched events data 249 is obtained from calendar event inference engine 290, as discussed below.

The calendar event inference engine 290 generally determines where a future calendar event will likely take place, whether the user will likely attend the meeting in person, and the type of calendar event (whether a work event or a private (non-work) event). Calendar event inference engine 290 includes future event location predictor 292, event attendance predictor 294, event-type classifier 296 and event enrichment tagging component 298.

Future event location predictor 292 determines the likely location of a future calendar event. Future event location predictor 292 receives event features (such as an explicit location from a location string) from calendar events and features 242. Future event location predictor also receives, in some embodiments, location information derived from similar historic calendar events (determined by calendar event behavior model generator 250) and stored in 245b. If an address is provided, or determined, the future event location predictor 292 may utilize a service to convert the address into actual latitude/longitude data. In some embodiments, the future event location predictor may determine a venue (such as an office building, or a restaurant) as the location. In other embodiments, the future event location predictor 292 may determine a known conference room (from historic data) that can be resolved to a particular location. Logic, such as event logic 230, may be utilized by future event location predictor 292, as is further described below.

Attendance predictor 294 determines whether the user will likely attend the future calendar event. Attendance predictor 294 uses the determined user behavior pattern model (generated by calendar event behavior pattern model generator 250) stored in 245b to determine if the likely user location matches the likely event location. If the likely user location matches the likely event location, it is inferred that the user will likely attend the event in person. Other external signals may also be used for inferring likely attendance. As an example, other user features 244 (such as other user-behavior patterns or routines from 245a or 245c of user profile 240) may include other user patterns, such as sleeping patterns or when the user tends to commute to work. If a recurring meeting takes place during this timeframe, such as when the user tends to sleep, an inference may be that the user is not likely to attend that meeting. As another example, it may be determined that a user tends not to take part in specific online meetings, which take place at specific times (such as by determining that a user's devices are not running the meeting-relevant apps). This information may be used to predict an attendee level at future similar meetings. In an embodiment, this determination is executed by event logic 230 in storage 225. In some embodiments, if a determined user behavior pattern model is not generated, a set of historic events similar to the identified future event are identified, as well as the user location for those identified historic event. The probability of the user's location at the identified future event is then given as the highest observation count, such that the most commonly occurring user location in the set of identified historic events similar to the future event is given as the likely user location. Alternatively, the likely location may be based on the distribution of the location in the set of identified similar historic events. As an example, if the set of similar historic events indicates that the user is home 90% of the time for similar events, but at work 10% of the time, then the logic indicates that the user has a 90% likelihood of being at home for the identified future calendar event. In some embodiments, a prediction confidence of the user location is determined and stored as a feature with the future calendar event. Generally, the more features in common between the future calendar event and the identified set of similar calendar events, the higher the predicted confidence in user location for the future calendar event. As an example, if the likely user location is identified as a restaurant (and not necessarily the same geographic location, but same venue type), if the user's behavior pattern model indicates the user typically attends calendar events in person for restaurant venues, then the inference would be that the user would attend the future calendar event in person at the restaurant.

Event type classifier 296 determines the type of calendar event. Generally, the calendar event may be identified as a work type event, or a private type event (non-work related). Other event types could also be determined as well. Event type classifier executes event logic stored in logic 230 that obtains the features of the identified future calendar event, patterns of features such as the predicted likely location of the user, and the likely location of the event to determine the likely calendar event type. As an example, if a calendar event contains an attendee list with the email domain common the user's workplace, the event type would be inferred to be a work type event. If the attendee list is mostly made up of the user's family members, then the event type would be inferred to be a private event.

Event enrichment component 298 tags or associates the likely event location (from future event location predictor 292), the likely user attendance (from attendance predictor 294) and the event type (from event type classifier 296) with the identified future event. These tagged future calendar event items are then stored in user profile 240 in enriched events 249. These tagged future calendar event items are then made available to various enriched event consumers 270.

Enriched event consumers 270 are able to utilize the enriched events 249 in a wide variety of ways. As an example, a particular event consumer could use the enriched events 249 to provide relevant traffic alerts to users, knowing the likely attendance of a user at a meeting and the likely location for the meeting. As another example, a calendaring enriched event consumer could include appropriate guidance on meeting times, such as adding time before and/or after a meeting, again by knowing the likely attendance of a user at a meeting and the likely location for the meeting. As yet another example, an enriched event consumer could offer calendar optimization suggestions based on location (such as by a suggested grouping of meetings at or near a particular location). As a further example, a visualization service could be provided (using presentation component 220) to color code calendar events by event type, location, or user location. Enriched event consumers 270 could also provide analytics such as how busy a user's day looks, whether meetings are work or private type meetings, and how many calendar events a user has at a particular location, etc. Knowing the meeting type, enriched event consumers could also provide targeted information (such as information about a particular venue once the likely location for the calendar item event is known). Other personalization could also be achieved, such as suggestions or recommendations about nearby restaurants, or prioritizing notifications based on a meeting type and user location. Many types of enriched event consumer 270 are able to offer other applications and services based on the enriched events 249.

As noted above, event logic 230 contains the rules, conditions, associations, classification models and other criteria to executed the functionality of future event location prediction 292, user attendance predictor 294 and event type classifier 296.

The presentation component 220 functions to render various interfaces and various other outputs generated by the calendar item enrichment system 200 and the components thereof in a format that can be displayed on user devices. By way of example, the presentation component 220 may render a calendaring service interface for receiving proposed calendar events and presenting additional information generated by the enriched event consumers 270.

Figure 3:
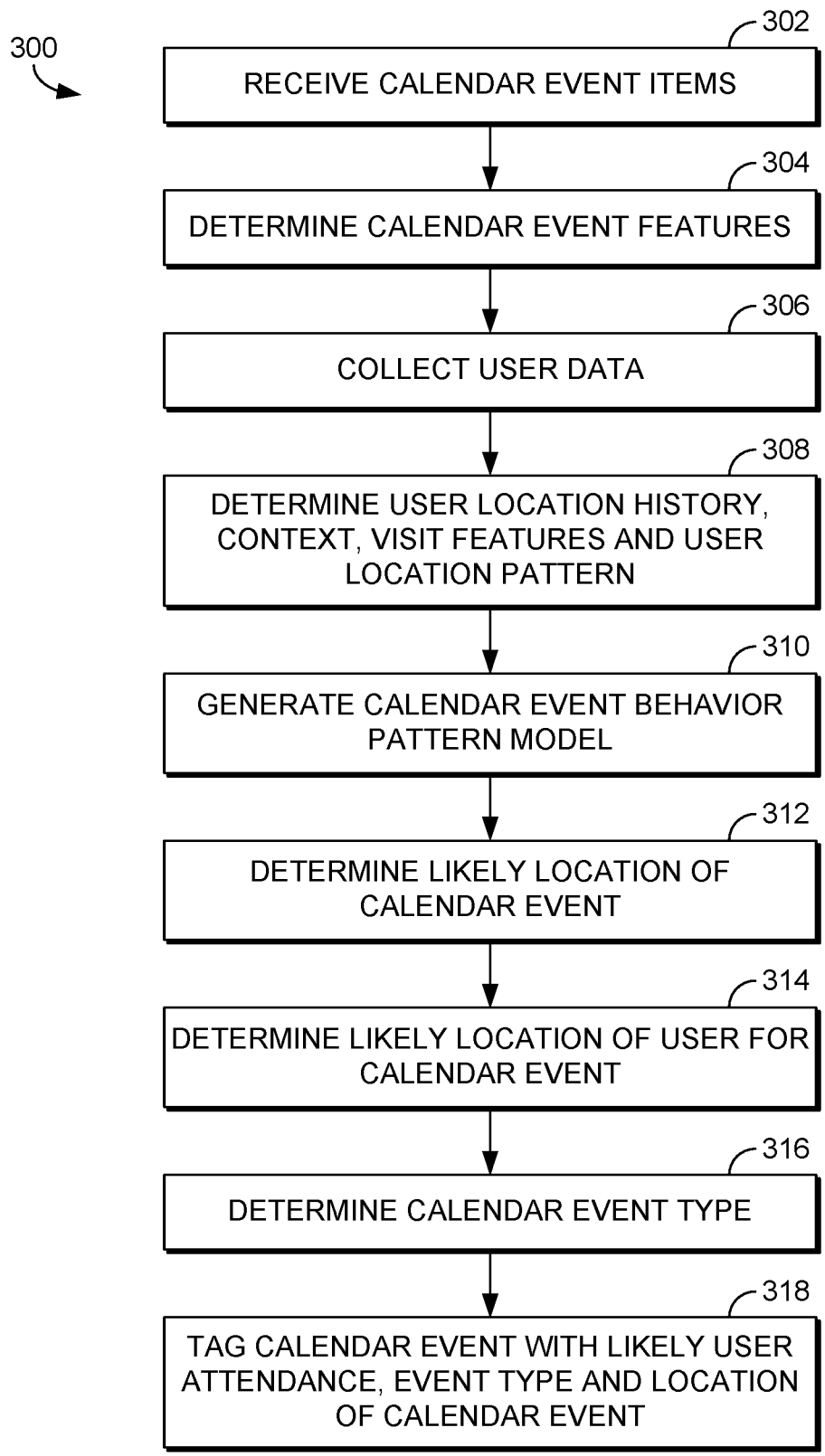
FIGS. 3-5 is a flow diagram showing a method for generating enriched events in embodiments of the present disclosure.

Turning now to FIG. 3, a flow diagram is provided that illustrates a method 300 for generating enriched events in accordance with an embodiment of the present disclosure. Initially, as shown at block 302, calendar item event are received, and features for the calendar item events are determined, at block 304 (such as by calendar event monitor 250, described above). User data is also collected at block 306, and information about the user, including the user location history, context and features of user visits and a user location pattern are determined in block 308 (such as by user data collection component 210 and user location pattern generator 260). In block 310, a calendar event behavior pattern model is generated (such as by component 250, described above). Global or group features may be used, in additional to user features. These features may be based on aggregated data of multiple users which serve as a reference population. In some aspects, these global or group features serve increased importance for calendar events for which the user has no other historical similar meetings. In block 312, the method includes determining the likely location of the calendar event (such as by future event location predictor 292). In block 314, the likely location of the user during the calendar event is determined, as well as whether the user is likely to attend the calendar event (for example, does the likely user location match the likely calendar event location). In block 316, the calendar event type is determined (such as by event type classifier 296, described above). In block 318, the likely location of the calendar event, the likely attendance of the user and the event type are tagged and associated with the calendar event, and stored in memory.

Figure 4:
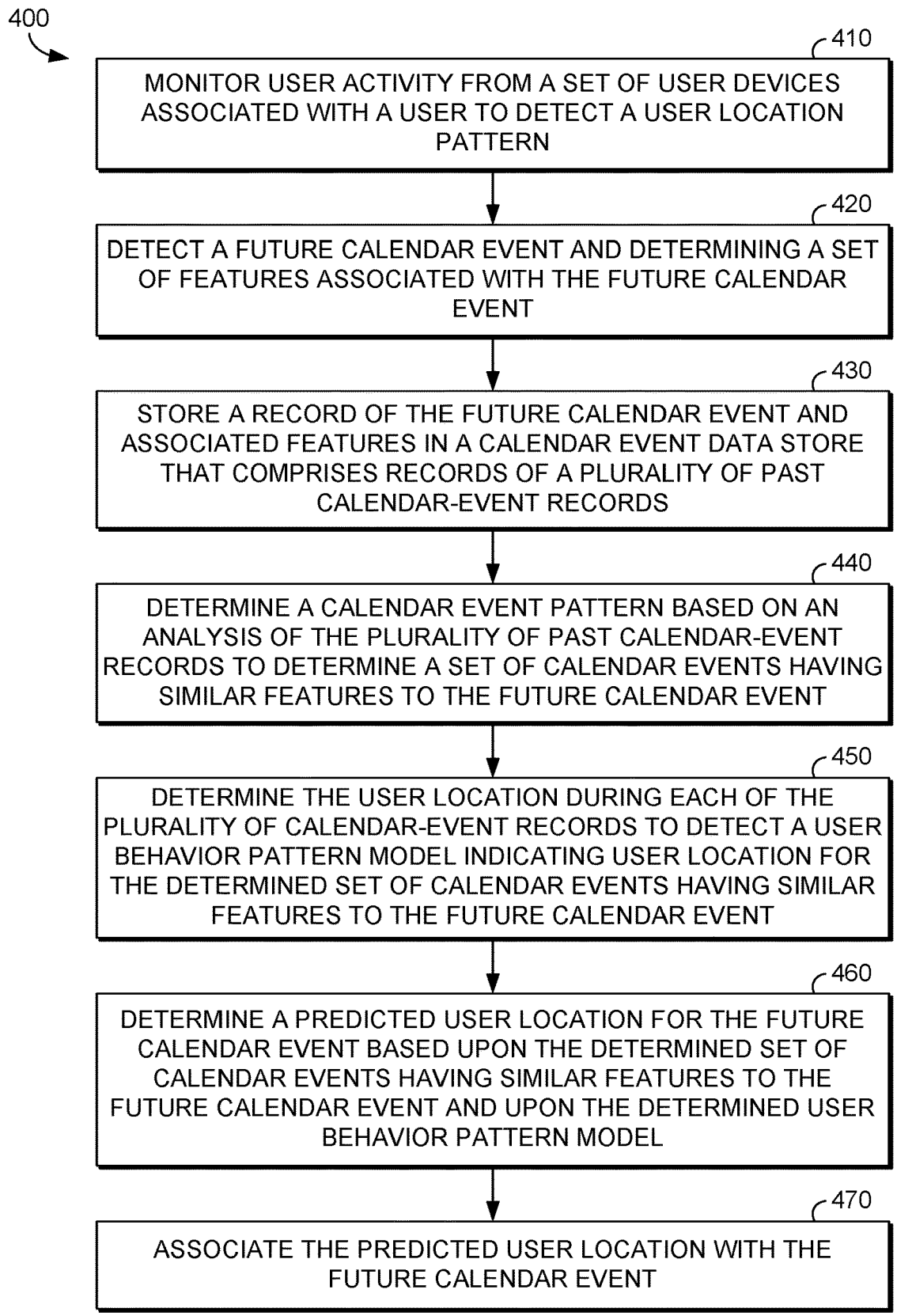

Turning now to FIG. 4, a flow diagram is provided that illustrates a method 400 for generating enriched events in accordance with an embodiment of the present disclosure. Initially, as shown at block 410, the method monitors user activity from a set of user devices that are associated with the user. The monitoring of block 410 detects or determines a user location pattern. At block 420 the method detects a future calendar event and determines a set of features associated with the future calendar event. The method stores, at block 430, a record of the future calendar event, and the associated features, in a calendar event data store that includes records of past calendar events. At block 440, the method determines a calendar event pattern. The calendar event pattern of block 440 is based on an analysis of the past calendar event records to determine a set of calendar event having similar features to the future calendar event (from block 420). The method determines, at block 450, the user location during each of the past calendar event records to detect a user behavior pattern model. The user behavior pattern model indicates a user location for the determined set of calendar events having features similar to the future calendar event. At block 460, the method determines a predicted user location for the future calendar event based upon the determined set of calendar events having similar features to the future calendar event, and upon the determined user behavior pattern model. At block 470, the method associates the predicted user location with the future calendar event.

Figure 5:
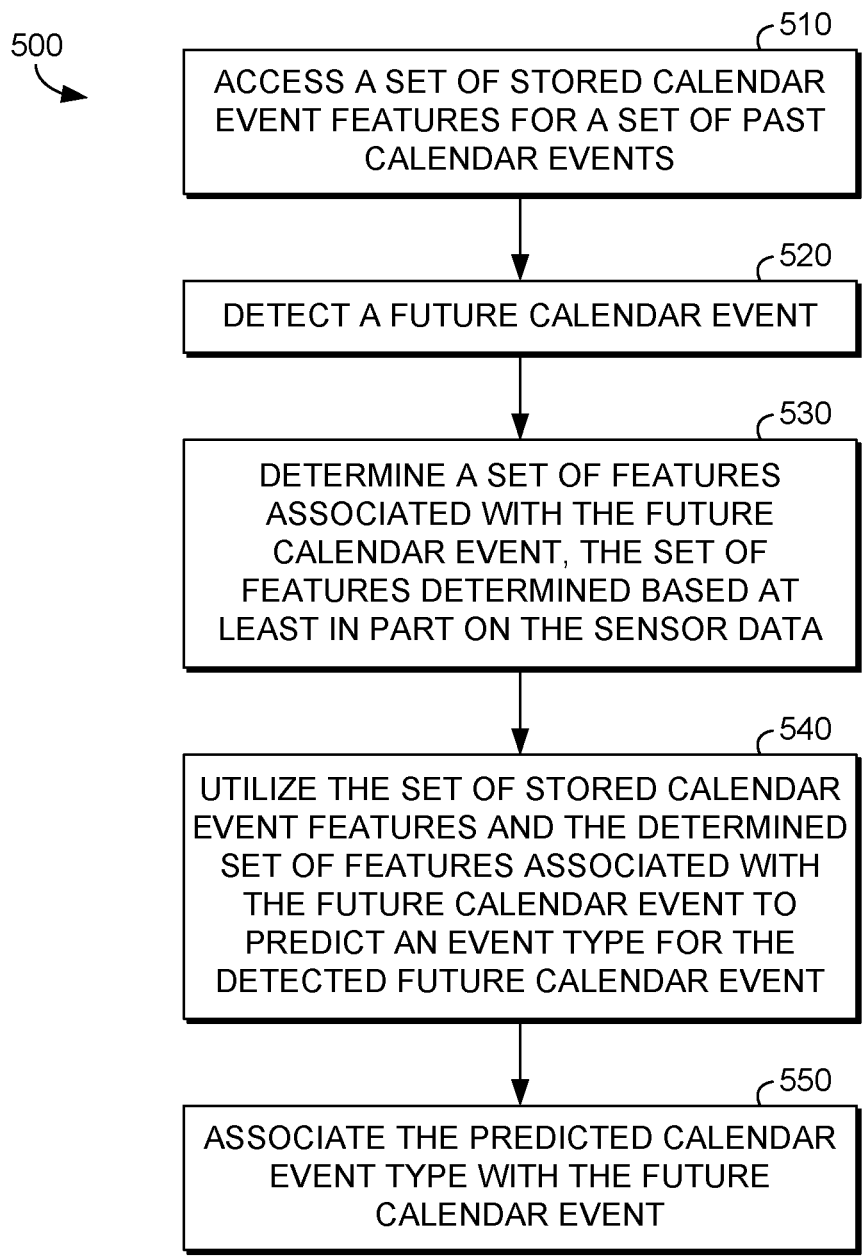

FIG. 5 illustrates a flow diagram for a method 300 for generating enriched events in accordance with an embodiment of the present disclosure. Initially, as shown at block 510 the method accesses a set of stored calendar event features for a set of past calendar events. At block 520, the method detects a future calendar event. With that future calendar event, the method determines a set of features associated with the future calendar event at block 530. This set of features is determined based at least in part on sensor data (such as from sensors 103*a* or 107). At block 540, the method utilizes the set of stored calendar event features and the determined set of features associated with the future calendar event to predict an event type for the detected future calendar event. The predicted calendar event type is associated with the future calendar event at block 550.

Accordingly, we have described various aspects of technology that provides added levels of information inferred from calendar event items and personalized computing experiences based on this information, improved performance of personal digital assistants and increasing the efficiency of computing resource usage and network bandwidth usage. It is understood that various features, sub-combinations, and modifications of the embodiments described herein are of utility and may be employed in other embodiments without reference to other features or sub-combinations. Moreover, the order and sequences of steps shown in the example methods 300, 400, and 500 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 6:
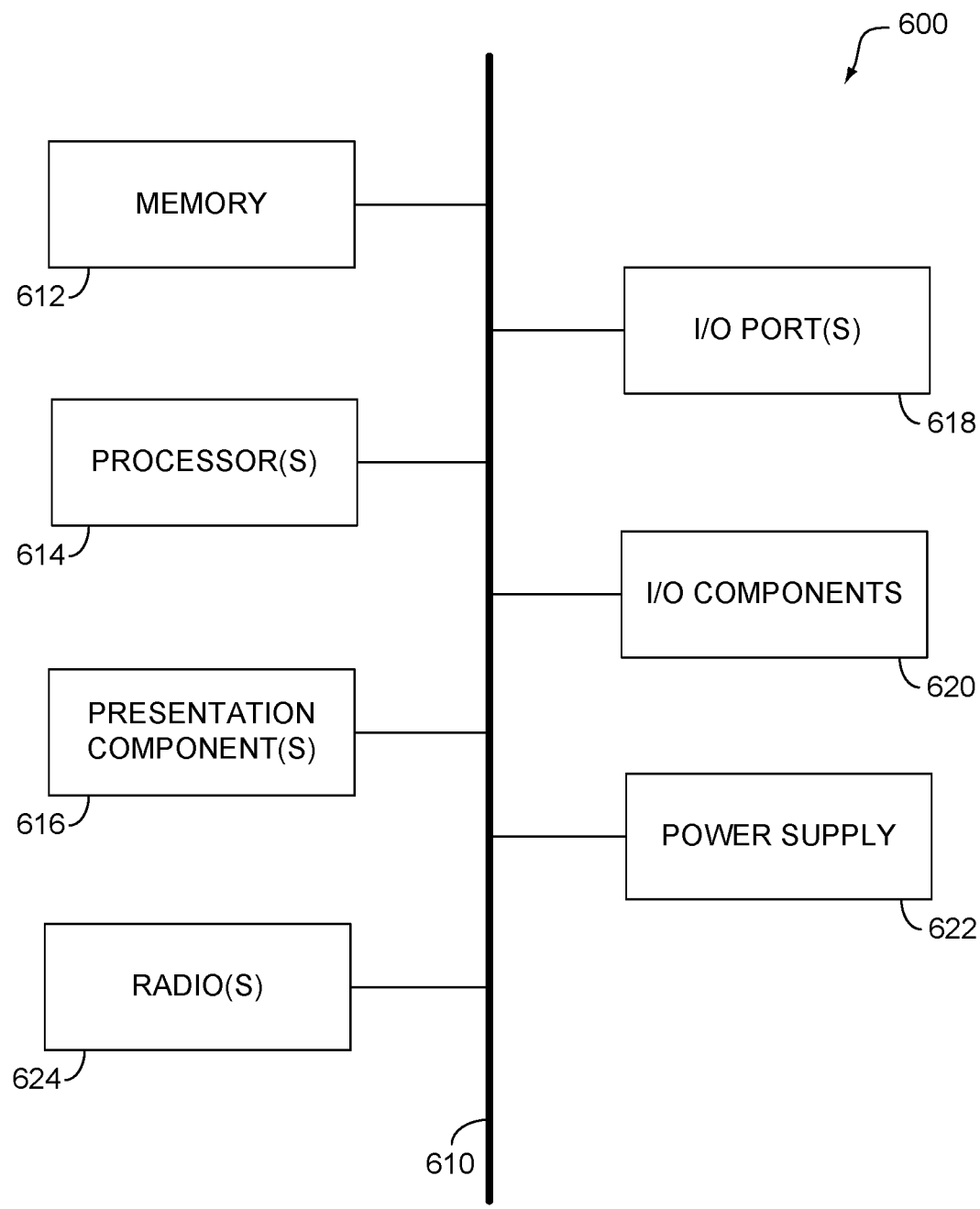
FIG. 6 is a block diagram of an exemplary computing environment suitable for use in implementing an embodiment of the present disclosure.

Having described various implementations, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. In some implementations presentation component 220 of system 200 may be embodied as a presentation component 616. Other examples of presentation components may include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system comprising:
one or more sensors configured to provide sensor data;
one or more processors; and
computer storage memory having computer-executable instructions stored thereon which, when executed by the one or more processors, implement a method comprising:
monitoring user activity from a set of user devices associated with a user to detect a user location pattern;
detecting a future calendar event having an unknown location;
determining a set of features associated with the future calendar event, the set of features determined based at least in part on the sensor data;
storing a record of the future calendar event and associated features in a calendar event data store that comprises records of a plurality of past calendar-event records;
based on an analysis of the plurality of past calendar-event records and on logic that is based on a machine learning algorithm, determining a set of calendar events having similar features to the future calendar event;
based on the determined set of features associated with the future calendar event and on the determined set of calendar events having similar features to the future calendar event, predicting a location of the future calendar event and associating the predicted location with the future calendar event;
determining a user location during each of the plurality of past calendar-event records to detect a user behavior pattern model indicating user location for the determined set of calendar events having similar features to the future calendar event;
determining a predicted user location for the future calendar event based upon the determined set of calendar events having similar features to the future calendar event and upon the determined user behavior pattern model;
associating the predicted user location with the future calendar event;
predicting a user attendance comprising whether the user will attend the future calendar event in person or remotely; and
associating the predicted user attendance with the future calendar event.

2. The system of claim 1, wherein the method further comprises determining semantic information including contextual calendar event features.

3. The system of claim 1, wherein the determined set of features includes features directly related to the future calendar event.

4. The system of claim 3, wherein the determined set of features further includes features associated with an organization of which the user is a part.

5. The system of claim 4, wherein the determined set of features further includes global features.

6. The system of claim 1, wherein the method further comprises determining, based upon the determined set of features for the future calendar event, the determined set of calendar events having similar features to the future calendar event, and the determined user behavior pattern model, a predicted event type for the future calendar event, and associating the predicted future calendar event type with the future calendar event.

7. The system of claim 6, wherein the event type is one of a work event type or a private event type.

8. The system of claim 1, further comprising predicting the user attendance at the future calendar event based at least in part upon the predicted user location and the predicted location for the future calendar event.

9. A computerized system comprising:
one or more sensors configured to provide sensor data;
one or more processors; and computer storage memory having computer-executable instructions stored thereon which, when executed by the one or more processors, implement a method comprising:
  accessing a set of stored calendar event features for a set of past calendar events;
  detecting a future calendar event having an unknown location;
  determining a set of features associated with the future calendar event, the set of features determined based at least in part on the sensor data;
  using the set of stored calendar event features, the determined set of features associated with the future calendar event, and logic that is based on a machine learning algorithm, predicting an event type for the detected future calendar event;
  associating the predicted calendar event type with the future calendar event;
  predicting a location of the future calendar event based on the determined set of features associated with the future calendar event;
  predicting user attendance of a user at the future calendar event based upon a predicted user location and the predicted location of the future calendar event, wherein predicting the user attendance comprises predicting whether the user will attend the future calendar event in person or remotely;
  associating the predicted user attendance with the future calendar event.

10. The system of claim 9, wherein the event type is a work event type or a private event type.

11. The system of claim 9, wherein the method further comprises:
  determining a calendar event pattern based on an analysis of the set of stored calendar event features to determine a set of calendar events having similar features to the future calendar event;
  determining a user location during each of the set of calendar events to detect a user behavior pattern model indicating user location for the set of calendar events having similar features to the future calendar event; and
  determining the predicted user location for the future calendar event.

12. A computerized system comprising:
  one or more sensors configured to provide sensor data;
  one or more processors; and
  one or more computer storage media storing computer-useable instructions that, when executed by the one or more processors, implement a method comprising:
    receiving user activity associated with a user that indicates a user location pattern;
    detecting a future calendar event and determining a set of features associated with the future calendar event, the set of features determined based at least in part on the sensor data;
    based on a plurality of past calendar-event records and on logic that is based on a machine learning algorithm, determining a set of calendar events having similar features to the future calendar event;
    based on the determined set of features associated with the future calendar event and on the determined set of calendar events having similar features to the future calendar event, predicting a location of the future calendar event and associating the predicted location with the future calendar event;
    determining a user location during each of the plurality of past calendar-event records to detect a user behavior pattern model indicating user location for the determined set of calendar events having similar features to the future calendar event;
    determining a predicted user location for the future calendar event based upon the determined set of calendar events having similar features to the future calendar event and upon the determined user behavior pattern model;
  associating the predicted user location with the future calendar event;
    predicting a user attendance comprising whether the user will attend the future calendar event in person or remotely; and
    associating the predicted user attendance with the future calendar event.

13. The system of claim 12, wherein the determined set of features includes features directly related to the future calendar event.

14. The system of claim 13, wherein the determined set of features further includes features associated with an organization of which the user is a part.

15. The system of claim 12, wherein the method further comprises determining, based upon the determined set of features for the future calendar event, the determined set of calendar events having similar features to the future calendar event, and the determined user behavior pattern model, a predicted event type for the future calendar event, and associating the predicted future calendar event type with the future calendar event.

16. The system of claim 12, wherein the method further comprises predicting the user attendance at the future calendar event based at least in part upon the predicted user location and the predicted location for the future calendar event.

17. The system of claim 9, wherein the predicted location of the future calendar event comprises a venue corresponding to a location included in the set of features associated with the future calendar event.

18. The system of claim 9, wherein the future calendar event is at least one of an online meeting or an in-person meeting.

19. The system of claim 9, wherein predicting the location of the future calendar event comprises predicting a particular conference room.

20. The system of claim 9, wherein predicting the location of the future calendar event comprises determining an address when the address is not received in a location string for the future calendar event.

* * * * *